United States Patent [19]

Burba, III et al.

[11] Patent Number: 4,594,335
[45] Date of Patent: Jun. 10, 1986

[54] TRANSITION METAL ALUMINATES

[75] Inventors: John L. Burba, III; Richard A. Wolcott, both of Angleton, Tex.

[73] Assignee: The Dow Chemical Company, Midland, Mich.

[21] Appl. No.: 609,381

[22] Filed: May 11, 1984

[51] Int. Cl.$^4$ .................. B01J 23/32; B01J 23/70; B01J 31/00; B01J 27/14

[52] U.S. Cl. .................. 502/324; 502/346; 502/150; 502/159; 502/201; 502/208; 502/213; 502/317; 502/224; 502/225; 502/226; 502/229; 502/231; 502/314; 252/184; 423/600; 423/24; 423/49; 423/100; 423/139

[58] Field of Search ............ 252/184; 423/600, 24, 423/49, 100, 139; 502/150, 159, 201, 208, 213, 217, 224, 225, 226, 229, 231, 314, 324, 346

[56] References Cited

U.S. PATENT DOCUMENTS

| 3,896,053 | 7/1975 | Broecker et al. | 502/346 X |
|---|---|---|---|
| 3,907,715 | 9/1975 | Arai et al. | 502/324 X |
| 3,932,534 | 1/1976 | Fukunoga et al. | 502/226 X |
| 4,009,124 | 2/1977 | Laurer et al. | 502/346 |
| 4,033,858 | 7/1977 | Granquist | 502/229 X |
| 4,059,679 | 11/1977 | Clearfield | 502/213 X |
| 4,116,856 | 9/1978 | Lee et al. | 252/184 |
| 4,116,857 | 9/1978 | Lee et al. | 252/184 |
| 4,116,858 | 9/1978 | Lee et al. | 252/184 |
| 4,185,967 | 1/1980 | Komodomor et al. | 502/314 X |
| 4,333,846 | 1/1982 | Lee et al. | 252/184 |
| 4,347,327 | 8/1982 | Lee et al. | 252/184 X |
| 4,348,295 | 9/1982 | Burba | 252/184 |
| 4,348,296 | 9/1982 | Bauman et al. | 252/184 |
| 4,348,297 | 9/1982 | Bauman et al. | 252/184 |
| 4,392,979 | 7/1983 | Lee et al. | 252/184 |
| 4,392,980 | 7/1983 | Lee et al. | 252/184 |
| 4,461,714 | 7/1984 | Burba | 252/184 |
| 4,477,367 | 10/1984 | Burba, III | 502/25 X |

FOREIGN PATENT DOCUMENTS 3042326  5/1981  Fed. Rep. of Germany ...... 502/314

Primary Examiner—William G. Wright
Attorney, Agent, or Firm—W. J. Lee

[57] ABSTRACT

Crystalline transition metal aluminate compounds are formed by reacting transition metal compounds with crystalline hydrous alumina, such as gibbsite, bayerite, norstrandite, boehmite and the like. The crystalline hydrous alumina may be unsupported by a solid substrate or may be supported on a solid substrate or within the pores of a solid substrate, such as a macroporous resin.

24 Claims, No Drawings

TRANSITION METAL ALUMINATES

BACKGROUND OF THE INVENTION

It has been taught in U.S. Pat. Nos. 4,333,846 and 4,392,980 that transition metal aluminates are prepared by reacting transition metal compounds with amorphous hydrous alumina, denoted as Al(OH)$_3$. The particular transition metal compounds demonstrated are Cu, Zn, Mn, Fe, Co, and Ni. These patents are incorporated herein by reference.

SUMMARY OF THE INVENTION

Crystalline transition metal aluminates are prepared by reacting alkali soluble transition metal compounds with crystalline hydrous alumina. These aluminates are useful, e.g., as precursors for spinel-type structures and as a catalytic materials. These compounds conform generally to the formula $MA_a{}^v Z_b{}^v \cdot nAl(OH)_3 \cdot mH_2O$ where M is a transition metal, n is a value to provide a mole ratio of Al/M in the range of about 1/1 to about 1.5/1 and m is zero or more for waters of hydration. A and Z represent anions as described below.

DETAILED DESCRIPTION OF THE INVENTION

The crystalline hydrous alumina which is to be reacted with a transition metal compound may be gibbsite, bayerite, norstrandite, boehmite, or any crystalline hydrous alumina which conforms, substantially, to the formula Al(OH)$_3$, Al$_2$O$_3 \cdot$nH$_2$O or AlOOH. Amorphous hydrous alumina is excluded from the present inventive concept; the present use of crystalline hydrous aluminas provides greater amounts (higher loadings) of the transition metal aluminates in the pores of ion exchange resins.

The transition metal compound is one which is soluble in a basic aqueous solution and is represented generally by the formula where $MA_a{}^v Z_b{}^v$ where M is divalent, A and Z each represent negative valence ions or radicals selected from the group comprising hydroxyl, halide, inorganic acid, and organic acid, v is a negative valence of 1, 2, 3, or more, a and b are each values of from zero to 2, with (va)+(vb) equal to 2. The "AZ" may represent, e.g., two monovalent ions or radicals; or one divalent ion or radical; or two-thirds of a trivalent ion or radical; or one-fourth of a quadrivalent ion or radical.

Examples of monovalent, divalent, and trivalent anions and negative radicals contemplated as constituting the "AZ" portion of the aluminate compound are, for example:

halide− (esp. Cl−, Br−, I−)
hydroxy− (OH−)
dihydroxyphosphate− (H$_2$PO$_4$−)
sulfate− − (SO$_4$− −)
hydrocarbonic− (HCO$_3$−)
hydrophosphate− − (HPO$_4$− −)
nitrate− (NO$_3$−)
chromate− (HCrO$_4$−)
trichloracetic− (Cl$_3$C—COO−)

and other inorganic acid radicals and organic acid radicals of monobasic, dibasic, and polybasic carboxylic acids with the valence of 1, 2, or more corresponding to the number of carboxyl groups present in the organic acid moiety. Examples of quadrivalent polybasic carboxylic acids are ethylenediamine tetraacetic acid and pyromellitic acid. Citric acid is an example of a tribasic acid.

The above is not an exhaustive listing, but is believed to be representative of the various negative radicals and anions contemplated to illustrate those which contain halogens, inorganic salt radicals, oxy radicals, and carboxylic radicals. Other radicals and anions will become obvious to practitioners of the relevant arts once they learn of the present invention.

The crystalline hydrous alumina and the transition metal compound (M) are preferably reacted in a basic (alkaline) aqueous medium at a temperature and for a time sufficient to convert an appreciable amount of the reactants to crystalline transition metal aluminate represented by the formula $MA_a{}^v Z_b{}^v \cdot nAl(OH)_3 \cdot mH_2O$ where $A_a{}^v Z_b{}^v$ is as defined above, where n is a value sufficient to provide an Al/M ratio of at least about 1/1, preferably at least about 1.5/1, most preferably at least about 2/1, and where m represents a value for waters of hydration of from zero (when the crystal has been dehydrated by heating) to as much as 6 or more, depending on the particular MAZ moiety in the crystal and also depending on the temperature, pH and conditions of preparation.

The alkalinity of the aqueous reaction medium may be supplied by using an alkali metal hydroxide or an alkaline earth metal hydroxide, but the alkaline earth metal cations (being divalent) are more likely to interfere with optimum conversion of the transition metal compound, so the alkali metal hydroxides are preferred, especially NaOH which is readily and abundantly available.

The amount of the alkaline compound, e.g. NaOH, should be enough to exhibit a pH of at least about 8 in the reaction mixture, preferably a pH of at least about 9 to about 14, most preferably a pH of about 13.

The amount of alkaline aqueous solution employed as the reaction medium should be at least enough to solubilize the MAZ compound and to slurry the hydrous alumina. The aqueous medium is substantially removed by filtration or decantation at the end of the reaction period and the remaining dampness of the reaction product may be reduced or removed by heating to dryness, by evaporation, or by dessication.

The time and temperature effective in reacting the crystalline hydrous alumina with the MAZ compound are interdependant, the time being shortened by elevating the temperature. Temperatures up to the boiling point may be used.

It is within the purview of the present invention to use transition metals which, under the conditions employed in the present method, will be divalent in the aluminate compound formed, especially Cu, Zn, Mn, Fe, Co, or Ni, most preferable Co and Ni.

The crystalline hydrous Al(OH)$_3$, such as gibbsite, bayerite, norstrandite, boehmite, and the like with which the transition metal compound is reacted may be carried on a substrate or dispersed within the pores of a porous solid, including ion exchange resins.

The following examples illustrate embodiments within the purview of the present inventive concept but the invention is not limited to the particular embodiments illustrated.

EXAMPLE 1

About 2 grams of crystalline Al(OH)$_3$, of the gibbsite form, and 7 ml. of 50% NaOH solution are mixed with 15 ml. of saturated CoCl$_2$ solution. After about 24 hours at 95° C. the reaction product is separated from the soluble portions, washed well with water, and dried to ambient room conditions. Analysis by x-ray diffraction confirms that crystalline $CoCl_2 \cdot Al(OH)_3 \cdot mH_2O$ is produced.

EXAMPLE 2

In substantially the same manner as in Example 1, other forms of crystalline hydrous alumina compounds, i.e., bayerite, norstrandite, boehmite, $Al_2O_3 \cdot nH_2O$ and AlOOH, are reacted with Co compounds in an alkaline aqueous carrier, at elevated temperature to form crystalline cobalt aluminate compounds of the formula $CoA_a{}^v Z_b{}^v \cdot nAl(OH)_3 \cdot mH_2O$, where AZ represents anions or negative-valence radicals in amounts sufficient to substantially satisfy the valence requirements of Co, and where n is a value of at least 1.

EXAMPLE 3

About 100 cc of DOWEX MWA-1-OH macroporous ion exchange resin (in the base form) containing 4.2 mmole Al/cc as crystalline bayerite, $Al(OH)_3$, is mixed with a solution 50 gm. $CoCl_2 \cdot 6H_2O$, 84 ml. 30% aq. solution of $NH_4OH$, 5 ml. of 50% aq. caustic (NaOH), and enough water to give a total voume of 250 ml. This mixture is held overnight at 100° C. in a closed vessel, after which time the resin is washed with water and titrated to pH 5.5 with HCl. By analysis it is found that the $Al(OH)_3$ is substantially reacted to form $CoCl_2 \cdot Al(OH)_3 \cdot mH_2O$ within the pores of the resin.

EXAMPLE 4

In accordance with the procedure of Example 1, but using $NiCl_2$ instead of $CoCl_2$, crystalline $NiCl_2 \cdot Al(OH)_3 \cdot mH_2O$ is formed.

EXAMPLE 5

About 105 cc of DOWEX MWA-1-OH macroporous ion exchange resin, loaded with 4.2 moles Al/cc as crystalline bayerite, is added to the following solutions:
64 gms. $Ni(NO_3)_2 \cdot 7H_2O$
88 ml. 30% aq. $NH_4OH$
2 ml. 50% caustic soda
250 ml. water
This mixture is heated overnight at 95° C., after which the resin is washed with water. X-ray diffraction analysis shows a hexagonal, three-layered crystal of $NiCl_2 \cdot Al(OH)_3 \cdot mH_2O$ within the pores of the resin; the X-ray data is:

| line: | 1 | 2 | 3 | 4 |
|---|---|---|---|---|
| d (obs): | 7.80 | 3.95 | 2.70 | 1.75 |

EXAMPLE 6

The $CoCl_2 \cdot Al(OH)_3 \cdot mH_2O$ of Example 1 is used as a cobalt ion getter by washing out part of the $CoCl_2$ which "unloads" the crystal and then mixing the unloaded crystal with an aqueous solution containing soluble Co values. Thus the crystal becomes reloaded specifically with Co salt values, even though the aqueous solution contains other metal ions.

The same applies to the $CoCl_2 \cdot Al(OH)_3 \cdot mH_2O$ of Example 3, as well as the $NiCl_2 \cdot Al(OH)_3 \cdot mH_2O$ of Examples 4 and 5, except that the Ni crystals of 4 and 5 are specific for getting Ni values from aqueous solutions.

We claim:
1. In a method for preparing a compound comforming substantially to the empirical formula
$MA_a{}^v Z_b{}^v \cdot nAl(OH)_3 \cdot mH_2O$
where M represents at least one divalent transition metal selected from the group comprising Cu, Zn, Mn, Fe, Co, and Ni,
where A and Z represent anions or negative-valence radicals of mono-, di-, or polyvalences, v represents the valence, a is an amount in the range of 0-2, b is an amount in the range of 0-2, with (va)+(vb) equal to 2 to satisfy the valence requirements of divalent M,
where n represents a numerical value such that the ratio of Al/M is at least 1/1, and
where m represents a numerical value for waters of hydration of zero or greater,
said process comprising
reacting hydrous alumina, in an alkaline aqueous carrier, with a transition metal compound of the empirical formula MAZ, where M, A, and Z are as described above,
said process being further characterized by performing said reaction at elevated temperature, using crystalline hydrous alumina.
2. The method of claim 1 wherein the crystalline hydrous alumina is gibbsite.
3. The method of claim 1 wherein the crystalline hydrous alumina is bayerite.
4. The method of claim 1 wherein the crystalline hydrous alumina is boehmite.
5. The method of claim 1 wherein the crystalline hydrous alumina conforms substantially to the formula $Al(OH)_3$, $Al_2O_3 nH_2O$ or AlOOH.
6. The method of claim 1 wherein the reaction of the crystalline hydrous alumina with the transition metal compound is performed in an alkaline carrier comprising aqueous NaOH.
7. The method of claim 1 wherein the reaction of the crystalline hydrous alumina with the transition metal compound is performed at an elevated temperature in the range of about 95° C. to about 100° C.
8. The method of claim 1 wherein the anions or negative-valence radicals are monovalent.
9. The method of claim 1 wherein the anions or neagative-valence radicals are divalent.
10. The method of claim 1 wherein the anions or negative-valence radicals are polyvalent.
11. The method of claim 1 wherein the anions or negative-valence radicals are inorganic.
12. The method of claim 1 wherein the anions or negative-valence radicals are organic.
13. The method of claim 1 wherein the anions or negative-valence radicals comprise both organic and inorganic varieties.
14. The method of claim 1 wherein the anions or negative-valence radicals comprise both monovalent and polyvalent varieties.
15. The method of claim 1 wherein the value of m is from zero to 6.
16. The method of claim 1 wherein the crystalline product formed is $M(OH)_2 \cdot 2Al(OH)_3 \cdot mH_2O$.
17. The method of claim 1 wherein the crystalline product formed is $MCl_2 \cdot 2Al(OH)_3 \cdot mH_2O$.
18. The method of claim 1 wherein M is Co.
19. The method of claim 1 wherein M is Ni.

20. The method of claim 1 wherein the crystalline hydrous alumina is supported by a solid substrate.

21. The method of claim 1 wherein the crystalline hydrous alumina is supported by a resin.

22. The method of claim 1 wherein the crystalline hydrous alumina is supported within the pores of a porous substrate.

23. The method of claim 1 wherein the crystalline hydrous alumina is supported within the pores of a porous resin.

24. The method of claim 1 wherein the crystalline hydrous alumina is supported within the pores of a macroporous ion exchange resin.

* * * * *

UNITED STATES PATENT AND TRADEMARK OFFICE
CERTIFICATE OF CORRECTION

PATENT NO. : 4,594,335

DATED : June 10, 1986

INVENTOR(S) : John L. Burba, III and Richard A. Wolcott

It is certified that error appears in the above-identified patent and that said Letters Patent is hereby corrected as shown below:

Col. 1, line 40; delete first occurrence of "where".

Col. 3, line 26; "voume" should read --volume--.

Col. 4, lines 4-5; "comforming" should read --conforming--.

Col. 4, line 6; insert --(crystalline)-- before the formula.

Col. 4, line 36; "$Al_2O_3nH_2O$" should read --$Al_2O_3 \cdot nH_2O$--.

Signed and Sealed this

Twenty-first Day of April, 1987

Attest:

DONALD J. QUIGG

Attesting Officer

Commissioner of Patents and Trademarks